(12) United States Patent
Craun et al.

(10) Patent No.: US 9,593,195 B2
(45) Date of Patent: *Mar. 14, 2017

(54) ACRYLIC GRAFTED POLYETHER RESINS BASED ON PHENOL STEARIC ACID AND COATING COMPOSITIONS FORMED THEREFROM

(71) Applicants: Akzo Nobel Coatings International B.V., Arnhem (NL); SI Group, Inc., Schenectady, NY (US)

(72) Inventors: Gary Pierce Craun, Berea, OH (US); Daniel Bode, Cleveland, OH (US); Timothy Edward Banach, Scotia, NY (US); Gary Joseph Robideau, Niskayuna, NY (US); Leigh Scott Howard, Ballston Spa, NY (US)

(73) Assignees: AKZO NOBEL COATINGS INTERNATIONAL B.V., Arnhem (NL); SI GROUP, INC., Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/776,185

(22) PCT Filed: Mar. 14, 2014

(86) PCT No.: PCT/EP2014/055048
§ 371 (c)(1),
(2) Date: Sep. 14, 2015

(87) PCT Pub. No.: WO2014/140234
PCT Pub. Date: Sep. 18, 2014

(65) Prior Publication Data
US 2016/0032040 A1  Feb. 4, 2016

Related U.S. Application Data

(60) Provisional application No. 61/791,964, filed on Mar. 15, 2013.

(30) Foreign Application Priority Data

Jul. 30, 2013 (EP) .................................... 13178520

(51) Int. Cl.
| | | |
|---|---|---|
| *C08F 283/02* | (2006.01) | |
| *C08F 283/06* | (2006.01) | |
| *C09D 171/00* | (2006.01) | |
| *C08F 283/10* | (2006.01) | |
| *C09D 151/08* | (2006.01) | |
| *C09D 163/10* | (2006.01) | |
| *C09D 7/12* | (2006.01) | |
| *C08G 65/26* | (2006.01) | |

(Continued)

(52) U.S. Cl.
CPC .......... *C08F 283/08* (2013.01); *C08F 283/02* (2013.01); *C08F 283/06* (2013.01); *C08F 283/10* (2013.01); *C08G 59/24* (2013.01); *C08G 63/66* (2013.01); *C08G 63/664* (2013.01); *C08G 65/26* (2013.01); *C08G 65/2603* (2013.01); *C08G 65/2606* (2013.01); *C08G 65/2609* (2013.01); *C08G 65/2612* (2013.01); *C08G 69/40* (2013.01); *C08L 63/00* (2013.01); *C09D 151/08* (2013.01); *C09D 171/12* (2013.01); *C08L 2205/05* (2013.01)

(58) Field of Classification Search
None
See application file for complete search history.

(56) References Cited

U.S. PATENT DOCUMENTS 3,324,059 A  6/1967 Scholnick et al.
3,378,522 A  4/1968 Martin
(Continued)

FOREIGN PATENT DOCUMENTS

CN  1533418 A  9/2004
EP  0 047 364 A1  3/1982
(Continued)

OTHER PUBLICATIONS

Dahlke et al., "Polyhydroxy Fatty Acids and Their Derivatives from Plant Oils," J. Am. Oil Chemists Soc. 72(3), pp. 349-353 (1995).*
Johannes Karl Fink, Petroleum Engineer's Guide to Oil Field Chemical and Fluids, Gulf Professional Publishing (2012).*
European Search Report for EP 13178520.6 dated Dec. 18, 2013.
International Search Report and Written Opinion for PCT/EP2014/055048, date of mailing Jun. 10, 2014.
(Continued)

*Primary Examiner* — Kregg Brooks
(74) *Attorney, Agent, or Firm* — Alice C. Su

(57) ABSTRACT

Coating compositions can be prepared from an acrylic grafted polyether resin, wherein the smallest difunctional hydroxyl phenyl segment used to form the acrylic grafted polyether resin has a molecular weight greater than about 500, and wherein the smallest difunctional hydroxyl phenyl segment used to form the acrylic grafted polyether resin does not comprise two or more non-impaired hydroxyl groups attached to two or more different five-membered or six-membered carbon atom rings in a segment having a molecular weight less than about 500. The acrylic grafted polyether resin can be prepared by reacting a dihydroxyl compound and/or a diamine compound with a phenol stearic acid compound to produce a diphenol, reacting the diphenol with a diglycidyl ether compound to form a polyether resin, and mixing the polyether resin with an ethylenically unsaturated monomer component in the presence of an initiator to form the acrylic grafted polyether resin.

14 Claims, No Drawings

(51) Int. Cl.

| | | |
|---|---|---|
| *C08G 63/66* | (2006.01) | |
| *C08G 63/664* | (2006.01) | |
| *C08G 69/40* | (2006.01) | |
| *C08F 283/08* | (2006.01) | |
| *C09D 171/12* | (2006.01) | |
| *C08G 59/24* | (2006.01) | |
| *C08L 63/00* | (2006.01) | |

(56) References Cited

U.S. PATENT DOCUMENTS

| | | | |
|---|---|---|---|
| 3,382,261 A | 5/1968 | Kittredge et al. | |
| 3,479,377 A | 11/1969 | Larimer et al. | |
| 3,526,607 A | 9/1970 | Brown et al. | |
| 3,551,367 A | 12/1970 | Gasper et al. | |
| 3,577,370 A | 5/1971 | Castro et al. | |
| 3,647,757 A | 3/1972 | Lee | |
| 4,683,273 A * | 7/1987 | Bode | C09D 151/08 523/412 |
| 5,252,637 A * | 10/1993 | Craun | C08F 283/10 523/406 |
| 5,359,025 A | 10/1994 | Kuo | |
| 5,426,139 A | 6/1995 | Bertram et al. | |
| 5,780,556 A | 7/1998 | Yezrielev et al. | |
| 8,227,561 B1 | 7/2012 | Carlson et al. | |
| 8,367,171 B2 | 2/2013 | Stenson et al. | |
| 8,449,960 B2 | 5/2013 | Skillman et al. | |
| 2006/0069231 A1 | 3/2006 | Kajimaru et al. | |
| 2007/0054140 A1 | 3/2007 | Mayr et al. | |
| 2007/0281179 A1 | 12/2007 | Ambrose et al. | |
| 2010/0243506 A1 | 9/2010 | Cleaver et al. | |
| 2011/0217561 A1 | 9/2011 | Fujimura et al. | |
| 2011/0294946 A1 * | 12/2011 | Craun | C08F 289/00 524/556 |
| 2016/0024337 A1 | 1/2016 | Bode et al. | |
| 2016/0032048 A1 | 2/2016 | Craun et al. | |

FOREIGN PATENT DOCUMENTS

| | | |
|---|---|---|
| EP | 2 397 522 A1 | 12/2011 |
| GB | 1396122 A | 6/1975 |
| JP | S61-183390 A | 8/1986 |
| JP | S63-099270 A | 10/1986 |
| JP | H05-214286 A | 8/1993 |
| JP | H05-271583 A | 10/1993 |
| JP | H06-184213 A | 7/1994 |
| JP | H07-330862 A | 12/1995 |
| JP | H11-263938 A | 9/1999 |
| JP | H11-315251 A | 11/1999 |
| JP | 2011/218691 A | 11/2011 |
| WO | 96/40832 A1 | 12/1996 |
| WO | 2010/068673 A1 | 6/2010 |
| WO | WO 2010/100121 A1 | 9/2010 |
| WO | WO 2013/092539 A1 | 6/2013 |
| WO | WO 2013/092541 A1 | 6/2013 |
| WO | 2015/138955 A2 | 9/2015 |
| WO | 2015/138959 A2 | 9/2015 |

OTHER PUBLICATIONS

Prepn. of Hydroxyl-Phenyl-Stearic Acid and Derivs.—by Alkylating Phenol With Oleic Acid, Imperial Chem. Inds. PLC, RD 274026A, Jan. 20, 1987, Abstract.

Machine translation of JPH07-330862 A, publication of which is Dec. 19, 1995.

* cited by examiner

ACRYLIC GRAFTED POLYETHER RESINS BASED ON PHENOL STEARIC ACID AND COATING COMPOSITIONS FORMED THEREFROM

This application is a national stage filing under 35 U.S.C. §371 of PCT/EP2014/055048, filed Mar. 14, 2014, which claims priority to U.S. Provisional Patent Application No. 61/791,964 filed Mar. 15, 2013, and European Patent Application No. 13178520.6, filed Jul. 30, 2013, the contents of which are each incorporated herein by reference in their entireties.

BACKGROUND OF THE INVENTION

1. Field of the Invention

The present invention relates to acrylic grafted bisphenol-A free polyether resins based on phenol stearic acid, coating compositions having the acrylic grafted polyether resins, methods of coating substrates with the coating compositions, and substrates coated with the coating compositions.

2. Description of Related Art

Many coating compositions currently used in the packaging coatings industry do not cure well when blended with phenolic resin crosslinkers. Melamine and benzoguanamine have been used as co-crosslinkers with phenolic resins to crosslink polyesters and cure has improved, but it is desired in the packaging coatings industry to avoid triazines, such as melamine and benzoguanamine, for health reasons. Isocyanates have been used as crosslinkers for polyesters, but the resulting coating compositions have less corrosion resistance compared to coating compositions crosslinked with phenolic crosslinkers, plus it is desired in the packaging coatings industry to avoid using isocyanates for health reasons. Phenol-terminated polyesters have been crosslinked with melamine crosslinkers, but melamine is undesirable for health reasons as mentioned above. Polyesters have also been terminated with p-hydroxybenzoic acid, but it is also desired in the packaging coatings industry to avoid hydroxybenzoic acids, as parabens are materials of high concern. Polyesters formed from the reaction product of polyols and bis-epoxies reacted with phenolic carboxylic acids/esters are also used, but carboxylic phenols are also undesired in the packaging coatings industry for health reasons. Polyesters have also been terminated with phenols from cardanol, a known sensitizer, but this is also a material of concern.

There is a desire among some consumers and brand owners in the packaging coatings industry to have coating compositions which are also free, or substantially free, of bisphenol A and polyvinyl chloride and which do not suffer from the above drawbacks.

SUMMARY OF THE INVENTION

The present invention relates to acrylic grafted bisphenol-A free acrylic grafted polyether resins based on phenol stearic acid, coating compositions having the acrylic grafted polyether resins, methods of coating substrates with the coating compositions, and substrates coated with the coating compositions. As used herein, the term "phenol stearic acid compound" is a compound prepared from the reaction product of oleic acid and a phenol, wherein the primary reaction product is 10-(p-hydroxyphenyl)-octadecanoic acid (also known as 9(10)-(hydroxyphenyl) octadecanoic acid), and wherein other materials formed from the reaction of oleic acid and phenol may be present in the reaction product.

In some embodiments of the invention, the smallest difunctional hydroxyl phenyl segment used to form the acrylic grafted polyether resin has a molecular weight greater than about 500, and the smallest difunctional hydroxyl phenyl segment used to form the acrylic grafted polyether resin does not comprise two or more non-impaired hydroxyl groups attached to two or more different five-membered or six-membered carbon atom rings in a segment having a molecular weight less than about 500. These structures with molecular weights less than about 500 and/or which comprise two or more non-impaired hydroxyl groups attached to two or more different five-membered or six-membered carbon atom rings in a segment having a molecular weight less than about 500 are suspected to be endocrine disruptors and thus undesirable for use in coating compositions which contact food or beverages. Monomers or the smallest difunctional hydroxyl phenyl segments used to form acrylic grafted polyether resins having a molecular weight greater than about 500 and/or not comprising two or more non-impaired hydroxyl groups attached to two or more different five-membered or six-membered carbon atom rings in a segment having a molecular weight less than about 500 are not suspected to be endocrine disruptors and are thus desirable for use in coating compositions which contact food or beverages.

In certain embodiments, an acrylic grafted polyether resin can be prepared by a method comprising reacting a dihydroxyl compound and/or a diamine compound with a phenol stearic acid compound to produce a diphenol, reacting the diphenol with a diglycidyl ether compound to form a polyether resin, and mixing the acrylic grafted polyether resin with an ethylenically unsaturated monomer component in the presence of an initiator to form the acrylic grafted polyether resin. The acrylic grafted polyether resins can crosslink with phenolic resins to produce coating compositions. The acrylic grafted polyether resins can be used to form coating compositions having excellent flexibility, hardness and resistance to attack by foods and beverages.

In some embodiments, the present invention includes methods of coating a substrate by applying the coating composition to the substrate. Substrates coated with the coating compositions are also disclosed. In some embodiments, the substrate is a can or packaging.

DETAILED DESCRIPTION OF THE INVENTION

As used in the afore-discussed embodiments and other embodiments of the disclosure and claims described herein, the following terms generally have the meaning as indicated, but these meanings are not meant to limit the scope of the invention if the benefit of the invention is achieved by inferring a broader meaning to the following terms.

The present invention includes substrates coated at least in part with a coating composition of the invention and methods for coating the substrates. The term "substrate" as used herein includes, without limitation, cans, metal cans, easy-open-ends, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of food and beverages.

The present invention relates to acrylic grafted bisphenol-A free polyether resins based on phenol stearic acid, coating compositions having the acrylic grafted polyether resins, methods of coating substrates with the coating compositions, and substrates coated with the coating compositions.

In some embodiments of the invention, the smallest difunctional hydroxyl phenyl segment used to form the acrylic grafted polyether resin has a molecular weight greater than about 500, and the smallest difunctional hydroxyl phenyl segment used to form the acrylic grafted polyether resin does not comprise two or more non-impaired hydroxyl groups attached to two or more different five-membered or six-membered carbon atom rings in a segment having a molecular weight less than about 500. These structures with molecular weights less than about 500 and/or which comprise two or more non-impaired hydroxyl groups attached to two or more different five-membered or six-membered carbon atom rings in a segment having a molecular weight less than about 500 are suspected to be endocrine disruptors and thus undesirable for use in coating compositions which contact food or beverages. Monomers or the smallest difunctional hydroxyl phenyl segments used to form acrylic grafted polyether resins having a molecular weight greater than about 500 and/or not comprising two or more non-impaired hydroxyl groups attached to two or more different five-membered or six-membered carbon atom rings in a segment having a molecular weight less than about 500 are not suspected to be endocrine disruptors and are thus desirable for use in coating compositions which contact food or beverages.

In certain embodiments, the acrylic grafted polyether resin can be prepared by a method comprising reacting a dihydroxyl compound and/or a diamine compound with a phenol stearic acid compound to produce a diphenol, reacting the diphenol with a diglycidyl ether compound to form a polyether resin, and mixing the polyether resin with an ethylenically unsaturated monomer component in the presence of an initiator to form the acrylic grafted polyether resin. The acrylic grafted polyether resins can be used to form coating compositions having excellent flexibility, hardness and resistance to attack by foods and beverages.

For non-limiting example, the dihydroxyl compound may comprise 1,4-cyclohexane dimethanol, butane diol, neopentyl glycol, 1,3-cyclohexane dimethanol, ethylene glycol, propylene glycol, 1,3-propane diol, trimethylol propane, diethylene glycol, a polyether glycol, benzyl alcohol, 2-ethyl hexanol, a polyester, a polycarbonate, a hydroxyl functional polyolefin, or a mixture thereof, the diamine compound may comprise a piperazine compound, ethylene diamine, hexamethylene diamine, a fatty diamine, or a mixture thereof, and the diglycidyl ether compound may comprise diglycidyl ethers of 1,4-cyclohexane dimethanol, butane diol, neopentyl glycol, cyclohexane dimethanol, ethylene glycol, propylene glycol, 1,3-propane diol, trimethylol propane, diethylene glycol, a polyether glycol, benzyl alcohol, 2-ethyl hexanol, a polyester, a polycarbonate, a hydroxyl functional polyolefin, or a mixture thereof.

The phenol stearic acid compound can be present in a mole ratio of about 1:1 of the hydroxyl or amine functionality. It is possible to have a slight excess of the phenol stearic acid compound, which may lead to some ester formation when the epoxy is reacted to form the polyether, or a slight excess of hydroxyl or amine, which may lead to broader polydispersity of the polyether formed.

Non-functional and/or hydroxyl functional monomers may be used, optionally with higher levels of an acid functional monomers to place the acrylic grafted polyether resin in solution. For non-limiting example, the acrylic grafted polyether resin may be prepared from an ethylenically unsaturated monomer component having non-functional ethylenically unsaturated monomers such as, for non-limiting example, butyl acrylate, methyl methacrylate, styrene, benzyl methacrylate and the like and mixtures thereof, and optionally with lesser amounts of functional monomers such as, for non-limiting example, hydroxy propyl methacrylate, hydroxy ethyl acrylate, glycidyl methacrylate, acrylic acid, methacrylic acid, acetoacetoxy ethyl methacrylate, phosphate esters monomethacrylate and the like and mixtures thereof. In some embodiments of the invention, the hydroxyl functional monomer is added at a level up to about 30% by weight of the ethylenically unsaturated monomer component mixture, the acid functional monomer is added at a level up to about 30% by weight of the ethylenically unsaturated monomer component mixture. In some embodiments, acetoacetoxy ethyl methacrylate is added at a level up to about 30% by weight of the ethylenically unsaturated monomer component mixture. Phosphate esters of monomethacrylates (such as Sipomer Pam-100, Pam-200 and Pam-400) can be added at a level up to about 20% by weight of the ethylenically unsaturated monomer component mixture. In some embodiments, about 10 to about 50% by weight of the ethylenically unsaturated monomer component mixture is an acid functional monomer. In some embodiments, the acid functional monomer is methacrylic acid.

This acid monomer may be neutralized with an amine to form a salt allowing the acrylic grafted polyether resin to be dispersed in water. The neutralizer may include, without limitation, ammonia, a tertiary amine, such as, for non-limiting example, dimethylethanolamine, 2-dimethylamino-2-methyl-1-propanol, tributylamine, or a combination thereof. For non-limiting example, the neutralizer may be employed in an amount up to about 100% based on of the amount of acid to be neutralized in the system.

The acrylic grafted polyether resin may be prepared in the presence of an initiator. The initiator can be added after the mixture is cooled. In some embodiments, the initiator is added over about 2 hours. The initiator may include without limitation, azo compounds such as for non-limiting example, 2,2'-azo-bis(isobutyronitrile), 2,2'-azo-bis(2,4-dimethylvaleronitrile), and 1-t-butyl-azocyanocyclohexane), hydroperoxides such as for non-limiting example, t-butyl hydroperoxide and cumene hydroperoxide, peroxides such as for non-limiting example, benzoyl peroxide, caprylyl peroxide, di-t-butyl peroxide, ethyl 3,3'-di(t-butylperoxy) butyrate, ethyl 3,3'-di(t-amylperoxy) butyrate, t-amylperoxy-2-ethyl hexanoate, 1,1,3,3-tetramethylbutyl-peroxy-2-ethylhexanoate, and t-butylperoxy pivilate, peresters such as for non-limiting example, t-butyl peracetate, t-butyl perphthalate, and t-butyl perbenzoate, as well as percarbonates, such as for non-limiting example, di(1-cyano-1-methylethyl)peroxy dicarbonate, perphosphates, t-butyl peroctoate, and the like and mixtures thereof. In some embodiments, the initiator is present in an amount from about 0.1 to about 15%, and alternatively from about 1 to about 5%, based on the weight of the monomer mixture. A preferred initiator to achieve carbon-carbon grafting is benzoyl peroxide. It is also possible to pre-form the acrylic polymer, then add it to the polyether epoxide, react the acid functional acrylic with the epoxide and then disperse the ester grafted material into water.

In some embodiments, the acrylic grafted polyether resin is crosslinked with a phenolic crosslinker to form a curable coating composition. The weight ratio of the phenolic crosslinker to the acrylic grafted polyether resin may be from about 5/95 to about 40/60 at about 30-60% solids. The crosslinked coating composition may provide excellent film performance at very short baking for coil applications.

Optionally, the mixture of acrylic grafted polyether resin and crosslinker can occur in the presence of a cure catalyst. Cure catalysts include, for non-limiting example, dodecyl benzene sulfonic acid, p-toluene sulfonic acid, phosphoric acid, and the like and mixtures thereof. In some embodiments, other polymers may be blended into the coating composition, such as without limitation, polyethers, polyesters, polycarbonates, polyurethanes and the like, as well as mixtures thereof. Cure conditions for packaging coatings in some embodiments are about 5 to about 60 seconds at about 400° F. to about 600° F., and alternatively about 5 seconds to about 20 seconds at about 400° F. to about 500° F.

The acrylic grafted polyether resins and the coating compositions of the invention can include conventional additives known to those skilled in the art, such as without limitation, flow agents, surface active agents, defoamers, anti-cratering additives, lubricants, heat-release additives, and cure catalysts.

In some embodiments of the invention, one or more acrylic grafted polyether resins or coating compositions having the acrylic grafted polyether resins are applied to a substrate, such as for non-limiting example, cans, metal cans, easy-open-ends, packaging, containers, receptacles, can ends, or any portions thereof used to hold or touch any type of food or beverage. In some embodiments, one or more coatings are applied in addition to the coating compositions of the present invention, such as for non-limiting example, a prime coat may be applied between the substrate and the coating composition.

The coating compositions can be applied to substrates in any manner known to those skilled in the art. In some embodiments, the coating compositions are sprayed or roll coated onto a substrate.

When applied, the coating compositions contain, for non-limiting example, between about 20% and about 40% by weight polymeric solids relative to about 60% to about 80% solvent. For some applications, typically those other than spraying, solvent borne polymeric solutions can contain, for non-limiting example, between about 20% and about 60% by weight polymer solids. Organic solvents are utilized in some embodiments to facilitate roll coating or other application methods and such solvents can include, without limitation, n-butanol, 2-butoxy-ethanol-1, xylene, propylene glycol, N-butyl cellosolve, diethylene glycol monoethyl ether and other aromatic solvents and ester solvents, and mixtures thereof. In some embodiments, N-butyl cellosolve is used in combination with propylene glycol. The resulting coating compositions are applied in some embodiments by conventional methods known in the coating industry. Thus, for non-limiting example, spraying, rolling, dipping, coil coating and flow coating application methods can be used. In some embodiments, after application onto a substrate, the coating composition is thermally cured at temperatures in the range of about 200° C. to about 250° C., and alternatively higher for time sufficient to effect complete curing as well as volatilizing any fugitive components.

The coating compositions of the present invention can be pigmented and/or opacified with known pigments and opacifiers in some embodiments. For many uses, including food use for non-limiting example, the pigment can be zinc oxide, carbon black, or titanium dioxide. The resulting coating compositions are applied in some embodiments by conventional methods known in the coating industry. Thus, for non-limiting example, spraying, rolling, dipping, and flow coating application methods can be used for both clear and pigmented films. In some embodiments, after application onto a substrate, the coating composition is thermally cured at temperatures in the range of about 130° C. to about 250° C., and alternatively higher for time sufficient to effect complete curing as well as volatilizing any fugitive components.

For substrates intended as beverage containers, the coating are applied in some embodiments at a rate in the range from about 0.5 msi to about 15 milligrams per square inch of polymer coating per square inch of exposed substrate surface. In some embodiments, the water-dispersible coating is applied at a thickness between about 0.1 msi and about 1.15 msi.

For substrates intended as beverage easy-open-ends, the coating are applied in some embodiments at a rate in the range from about 1.5 to about 15 milligrams per square inch of polymer coating per square inch of exposed substrate surface. Conventional packaging coating compositions are applied to metal at about 232 to about 247° C. Some of the coating compositions of the current invention achieve good results at about 230° C. or below, such as at about 210° C. or below. This decreased temperature provides an energy savings to the coater, and it may allow the use of different alloys, such as tin-plated steel used for easy-open-ends. This also allows to recycle the ends together with the can body. When used as a coating for the easy-open-end of a metal container, the coatings of the invention exhibit resistance to retorted beverages, acidified coffees, isotonic drinks, and the like. In some embodiments, the solids content of the coating composition is greater than about 30% and the coating composition has a viscosity from about 35 to about 200 centipoise at 30% solids or above to produce a film weight of about 6 to about 8 msi (milligrams per square inch) so that over blister is minimized and so that the film can have good chemical resistance, such as aluminum pick-up resistance. Some of the coating compositions of the current invention can be used for both inside and outside easy-open-end applications.

EXAMPLES

The invention will be further described by reference to the following non-limiting examples. It should be understood that variations and modifications of these examples can be made by those skilled in the art without departing from the spirit and scope of the invention.

Example 1

Synthesis of a Diphenol 78 grams of 1,4-cyclohexane dimethanol, 506 grams of phenol stearic acid and 0.20 grams of butyl stanoic acid were heated with a distillation column and overhead to 225° C. About 18 grams of water was produced. Xylene was used as a carrier solvent to achieve a final acid number of less than 5 mg KOH/gram of the resin.

Example 2

Synthesis of an Acrylic Grafted Polyether Resin 155 grams of the diphenol from Example 1, 59 grams of cyclohexane dimethanol diglycidyl ether and 0.2 grams of 2-phenyl imidazole were heated to 180° C. and held for 2 hours. The epoxy equivalent weight was 2430. The mixture was held for 2 more hours at 190° C. The epoxy equivalent weight was 3930.

Example 3

Synthesis of an Acrylic Grafted Polyether Resin 70 grams of the acrylic grafted polyether resin from Example 2 and 100 grams of butyl cellosolve were heated to 120° C. To the resulting mixture, 18 grams of methacrylic acid, 10 grams of butyl acrylate, 42 grams of styrene and 5 grams of benzoyl peroxide were added over 2 hours under a nitrogen blanket. The mixture was held for 30 minutes 1 gram of t-butyl peroctoate was added and the mixture was held for 30 minutes. Another 1 gram of t-butyl peroctoate was added and the mixture was held for 30 minutes. The resulting mixture was cooled to 80° C. 15 grams of diemethylethanolamine in 20 grams of water were added, followed by an additional 280 grams of water under shear. A stable, translucent dispersion was produced.

Example 4

Synthesis of a Coating Composition 18 grams of a phenolic resin dissolved in 18 grams of butyl cellosolve was added to 100 grams of the acrylic grafted polyether resin from Example 3. The resulting coating film was drawn down on ETP steel with a #7 rod and baked for 10 minutes at 200° C. An amber colored, glossy film was produced that had a 2H pencil hardness, was able to withstand 100 MEK rubs with very slight mar, had 100% tape-off cross hatch adhesion, no cracking after 20 inch-pound reverse impacts, and no blush or adhesion loss after 1 hour in boiling water.

Example 5

Synthesis of a Diphenol 79.3 grams of 1,4-cyclohexane dimethanol, 451 grams of phenol stearic acid and 0.20 grams of butyl stanoic acid were heated under nitrogen to 225° C. over 1 hour in a 1 liter flask equipped with a stiffer, thermocouple temperature controller, and a packed distillation column (10 inch Vigreux topped with 4 inches of glass tube section packing). The mixture was held until the column head temperature dropped to about 60° C. The column was switched for a Dean Stark trap and xylene was added to obtain a steady reflux for 6 hours. The mixture was cooled and the final acid number was 4 mg KOH/g resin.

Example 6

Synthesis of an Acrylic Grafted Polyether Resin 128 grams of the diphenol from Example 5, 40.4 grams of GE-22 (CVC Industries) diglycidyl ether of 1,4-cyclohexane diglycidyl ether and 0.5 grams of 2-phenyl imidazole were heated to 175° C. and held for 4 hours. The epoxy equivalent weight was 7140 and the viscosity was 478 poise at 50° C.

Example 7

Synthesis of a Diphenol 451 grams of phenol stearic acid, 43.1 grams of piperazine and 0.20 grams of butyl stanoic acid were heated under nitrogen to 225° C. over 1 hour in a 1 liter flask equipped with a stirrer, thermocouple temperature controller, and a packed distillation column (10 inch Vigreux topped with 4 inches of glass tube section packing). The mixture was held until the column head temperature dropped to about 60° C. The column was switched for a Dean Stark trap and xylene was added to obtain a steady reflux for 6 hours. The mixture was cooled and the final acid number was 9.3 mg KOH/g resin.

Example 8

Synthesis of a Diamide 2,256 grams of phenol stearic acid, 329 grams of Dytec A, and 0.95 grams of butyl stanoic acid were heated to 185° C. in a glass flask. The reaction temperature was controlled such that the head temperature on a distillation column did not exceed about 98° C. as the batch temperature was raised to 225° C. The batch was held at about 225° C. until the head temperature dropped below about 70° C. Water continued to distill off (approximately 80 grams) with an overhead for two hours, then switched to a xylene azeotrope. About 20 grams of xylene remained in the diamide. The mixture was cooked to an acid number of about 5 mg KOH/grams of resin and a base number of less than 2.

Example 9

Synthesis of a Diester 961 grams of phenol stearic acid, 160 grams of cyclohexane dimethanol, and 0.4 grams of butyl stanoic acid were heated to 185° C. in a glass flask. The reaction temperature was controlled such that the head temperature on a distillation column did not exceed about 98° C. as the batch temperature was raised to 225° C. The batch was held at about 225° C. until the head temperature dropped below about 70° C. Water continued to distill off (approximately 80 grams) with an overhead for two hours, then switched to a xylene azeotrope. About 20 grams of xylene remained in the diester. The mixture was cooked to an acid number of about 5 mg KOH/grams of resin.

Example 10

Epoxy Advancement 800 grams of the diamide from example 8, 277 grams of cyclohexane dimethanol diglycidyl ether, and 3 grams of 2-phenyl imidazole were heated to 175° C. in a glass flask. There was a slight exotherm to 180-185° C. The mixture was held for four hours until the viscosity reached 80-110 p (100° C. cone and plate viscometer). The mixture was cooled to 120° C. and 150 grams of butyl cellosolve and 150 grams of butanol were added. The mixture continued to cool and was poured out at room temperature.

Example 11

Epoxy Advancement 1,253 grams of the diamide from example 8, 352 grams of butane diol diglycidyl ether, and 3 grams of 2-phenyl imidazole were heated to 175° C. in a glass flask. There was a slight exotherm to 180-185° C. The mixture was held for four hours until the viscosity reached 80-110 p (100° C. cone and plate viscometer). The mixture was cooled to 120° C. and 150 grams of butyl cellosolve and 150 grams of butanol were added. The mixture continued to cool and was poured out at room temperature.

Example 12

Synthesis of an Epoxy-Acrylic Grafted Emulsion 950 grams of the epoxy in example 10 were heated to 115° C. in a glass reactor. 95 grams of butyl cellosolve and 222 grams of butanol were added. Next, the following mixture was added over two hours: 152 grams of methyl acrylic acid, 430 grams of styrene, 13 grams of ethyl acrylate, 51 grams of benzoyl peroxide and 63 grams of butyl cellosolve. After the feed finished, the contents of the reactor were held at 155° C. for another hour. 8 grams of peroctoate were added and the mixture was held for another hour. The mixture was cooled to 90° C. and a mixture of 106 grams of dimethylethanolamine and 106 grams of water was added to the reactor over 15 minutes. The temperature was held at 85° C. for 30 minutes. 1714 grams of water was added and the mixture was cooled.

Example 13

Synthesis of an Epoxy-Acrylic Grafted Emulsion 700 grams of the epoxy in example 10 were heated to 115° C. in a glass reactor. 17 grams of butyl cellosolve and 84 grams of butanol were added. Next, the following mixture was added over two hours: 80 grams of methyl acrylic acid, 94 grams of styrene, 7 grams of ethyl acrylate, 27 grams of benzoyl peroxide and 33 grams of butyl cellosolve. After the feed finished, the contents of the reactor were held at 155° C. for another hour. 8 grams of peroctoate were added and the mixture was held for another hour. The mixture was cooled to 90° C. and a mixture of 56 grams of dimethylethanolamine and 56 grams of water was added to the reactor over 15 minutes. The temperature was held at 85° C. for 30 minutes. 838 grams of water was added and the mixture was cooled.

Example 14

Synthesis of an Epoxy-Acrylic Grafted Emulsion 1,260 grams of the epoxy in example 11 were heated to 115° C. in a glass reactor. 30 grams of butyl cellosolve and 150 grams of butanol were added. Next, the following mixture was added over two hours: 144 grams of methyl acrylic acid, 175 grams of styrene, 12 grams of ethyl acrylate, 29 grams of benzoyl peroxide and 60 grams of butyl cellosolve. After the feed finished, the contents of the reactor were held at 155° C. for another hour. 7 grams of peroctoate were added and the mixture was held for another hour. The mixture was cooled to 90° C. and a mixture of 101 grams of dimethylethanolamine and 101 grams of water was added to the reactor over 15 minutes. The temperature was held at 85° C. for 30 minutes. 1,931 grams of water was added and the mixture was cooled.

Example 15

Epoxy Advancement 800 grams of the diester from example 9, 277 grams of cyclohexane dimethanol diglycidyl ether, and 3 grams of 2-phenyl imidazole were heated to 175° C. in a glass flask. There was a slight exotherm to 180-185° C. The mixture was held for four hours until the viscosity reached 80-110 p (100° C. cone and plate viscometer). The mixture was cooled to 120° C. and 150 grams of butyl cellosolve and 150 grams of butanol were added. The mixture continued to cool and was poured out at room temperature.

Example 16

Synthesis of an Epoxy-Acrylic Grafted Emulsion 1,260 grams of the epoxy in example 15 were heated to 115° C. in a glass reactor. 30 grams of butyl cellosolve and 150 grams of butanol were added. Next, the following mixture was added over two hours: 144 grams of methyl acrylic acid, 175 grams of styrene, 12 grams of ethyl acrylate, 29 grams of benzoyl peroxide and 60 grams of butyl cellosolve. After the feed finished, the contents of the reactor were held at 155° C. for another hour. 7 grams of peroctoate were added and the mixture was held for another hour. The mixture was cooled to 90° C. and a mixture of 101 grams of dimethylethanolamine and 101 grams of water was added to the reactor over 15 minutes. The temperature was held at 85° C. for 30 minutes. 1,931 grams of water was added and the mixture was cooled.

Example 17

Synthesis of a Blend Formulation

50:50 (ratio of phenyl stearate diamide-epoxy to acrylic graft) of the cyclohexane dimethanol diglycidyl ether epoxy diamide from example 12 was crosslinked with a hydroxyalkamide (Primid XL-552) at 5% by weight. The blend formulation has excellent corrosion resistance after a 90 minute soak at 250° F. in a 2% brine solution. The blush was marginal for the blend after a 90 minute soak at 250° F. in a 1% lactic acid solution. Compared to a commercial epoxy bisphenol A coating, the overall performance was improved.

Example 18

Synthesis of a Blend Formulation

70:30 (ratio of phenyl stearate diamide-epoxy to acrylic graft) of the cyclohexane dimethanol diglycidyl ether epoxy diamide from example 13 was crosslinked with a phenyl methyl silicone emulsion at 4% by weight. The blend formulation has excellent corrosion resistance after a 90 minute soak at 250° F. in a 2% brine solution. The blush was better than example 17.

Example 19

Synthesis of a Blend Formulation

70:30 (ratio of phenyl stearate diamide-epoxy to acrylic graft) of the butane diol diglycidyl ether epoxy diamide from example 14 was crosslinked with a phenyl methyl silicone emulsion at 4% by weight. The blend formulation has excellent corrosion resistance and blush resistance.

Example 20

Synthesis of a Blend Formulation

70:30 (ratio of phenyl stearate diamide-epoxy to acrylic graft) of the butane diol diglycidyl ether epoxy diamide from example 16 was crosslinked with a phenyl methyl silicone emulsion at 4% by weight. The blend formulation had poor corrosion resistance and blush resistance.

What is claimed is:

1. A bisphenol-A free acrylic grafted polyether resin prepared by a method comprising the steps of:
   a) reacting a dihydroxyl compound and/or a diamine compound with a phenol stearic acid compound comprising 10-(p-hydroxyphenyl)-octadecanoic acid to produce a diphenol;
   b) reacting the diphenol with a diglycidyl ether compound to form a polyether resin; and
   c) mixing the polyether resin with an ethylenically unsaturated monomer component in the presence of an initiator to form the bisphenol-A free acrylic grafted polyether resin.

2. The bisphenol-A free acrylic grafted polyether resin of claim 1, wherein the bisphenol-A free acrylic grafted polyether resin is neutralized in the presence of water to form a coating composition.

3. The bisphenol-A free acrylic grafted polyether resin of claim 1, wherein the dihydroxyl compound comprises 1,4-cyclohexane dimethanol, butane diol, neopentyl glycol, 1,3-cyclohexane dimethanol, ethylene glycol, propylene glycol, 1,3-propane diol, diethylene glycol, a polyether glycol, a polyester, a polycarbonate, a hydroxyl functional polyolefin, or a mixture thereof.

4. The bisphenol-A free acrylic grafted polyether resin of claim 1, wherein the diamine compound comprises a piperazine compound, ethylene diamine, hexamethylene diamine, a fatty diamine, or a mixture thereof.

5. The bisphenol-A free acrylic grafted polyether resin of claim 1, wherein the diglycidyl ether compound comprises the diglycidyl ether of 4-cyclohexane dimethanol, butane diol, neopentyl glycol, cyclohexane dimethanol, ethylene glycol, propylene glycol, 1,3-propane diol, trimethylol propane, diethylene glycol, a polyether glycol, or a mixture thereof.

6. The bisphenol-A free acrylic grafted polyether resin of claim 1, wherein the acid number of the bisphenol-A free acrylic grafted polyether resin is less than about 30 mg KOH/resin.

7. The bisphenol-A free acrylic grafted polyether resin of claim 1, wherein the bisphenol-A free acrylic grafted polyether resin is prepared in the presence of a catalyst.

8. The bisphenol-A free acrylic grafted polyether resin of claim 7, wherein the catalyst is an acid catalyst.

9. The bisphenol-A free acrylic grafted polyether resin of claim 1, wherein the phenol stearic acid compound is present in a mole ratio of about 1:1 of the hydroxyl or amine functionality.

10. The bisphenol-A free acrylic grafted polyether resin of claim 1, wherein the polyether resin is prepared in the presence of an initiator comprising t-butyl peroxy benzoate, t-butyl peroctoate, dibenzoyl peroxide, 1,1,3,3-tetramethyl-butyl-peroxy-2-ethylhexanoate, or a mixture thereof.

11. A coating composition comprising the bisphenol-A free acrylic grafted polyether resin of claim 1.

12. A method of coating a substrate comprising applying the coating composition of claim 11 to the substrate.

13. The coating composition of claim 11, further comprising a crosslinker.

14. The coating composition of claim 13, wherein the crosslinker comprises a phenolic resin.

* * * * *